United States Patent [19]

Yasuda et al.

[11] Patent Number: 5,182,061
[45] Date of Patent: Jan. 26, 1993

[54] METHOD OF VIBRATION-MOLDING FRICTION MEMBER

[75] Inventors: Go Yasuda; Akira Wada, both of Tokyo, Japan

[73] Assignee: Nisshinbo Industries, Inc., Tokyo, Japan

[21] Appl. No.: 729,712

[22] Filed: Jul. 9, 1991

[30] Foreign Application Priority Data

Jul. 20, 1990 [JP] Japan ................................. 2-190427

[51] Int. Cl.⁵ .................. B28B 1/08; B29C 35/00; B29C 43/02
[52] U.S. Cl. ...................... 264/72; 264/40.5; 264/120; 264/294; 264/331.13; 425/149; 425/150
[58] Field of Search ............... 264/69, 71, 72, 331.13, 264/120, 122, 40.1, 40.3, 40.4, 40.5, 259, 294, 320, 325; 425/135, 149, 150

[56] References Cited

U.S. PATENT DOCUMENTS

| Re. 18,062 | 5/1931 | Doerschuk | 264/71 X |
| 2,309,571 | 1/1943 | Bruce et al. | 264/120 X |
| 4,105,729 | 8/1978 | Helmrich et al. | 264/120 X |
| 4,108,935 | 8/1978 | Moneghan | 264/122 X |
| 4,119,692 | 10/1978 | Durinck | 264/71 |
| 4,203,936 | 5/1980 | Kiwak et al. | 264/120 X |
| 4,432,922 | 2/1984 | Kaufman et al. | 264/120 X |
| 4,457,967 | 7/1984 | Chareire et al. | 264/60 X |
| 4,900,240 | 2/1990 | Leinweber | 264/120 X |
| 4,968,468 | 11/1990 | Leinweber | 264/122 X |

FOREIGN PATENT DOCUMENTS

| 3002420 | 7/1981 | Fed. Rep. of Germany | 264/120 |
| 3614274 | 10/1987 | Fed. Rep. of Germany | 264/71 |
| 592599 | 2/1978 | U.S.S.R. | 264/333 |
| 821186 | 4/1981 | U.S.S.R. | 264/331.13 |
| 996213 | 2/1983 | U.S.S.R. | 264/72 |
| 1248819 | 8/1986 | U.S.S.R. | 264/333 |
| 1418039 | 8/1988 | U.S.S.R. | 264/71 |
| 1423392 | 9/1988 | U.S.S.R. | 264/71 |
| 1017462 | 1/1966 | United Kingdom | 264/311 |

Primary Examiner—Karen Aftergut
Attorney, Agent, or Firm—Rogers & Killeen

[57] ABSTRACT

A friction member, such as a brake lining, disk pad or clutch facing, may be molded using a method in which the mold for the member is vibrated at a frequency and with amplitudes that are selected to imbue the friction member with desired physical properties, such as a predetermined specific gravity and porosity. The materials forming the friction member may be placed in a mold and the pressure on the mold increased and relaxed a predetermined number of times. Each time the pressure on the mold is increased, the mold is vibrated at the desired frequency and with the desired amplitude to achieve the desired physical properties. Upon completeion of the periodic vibration of the mold, the material in the mold may be subjected to a predetermined rated pressure for a predetermined period of time without vibration.

9 Claims, 8 Drawing Sheets

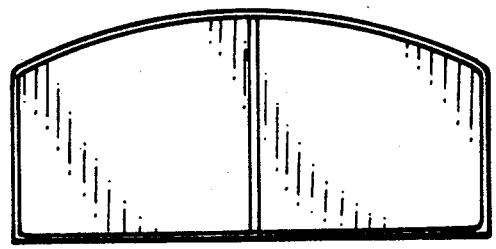
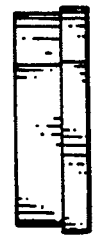
FIG. 6a         FIG. 6b
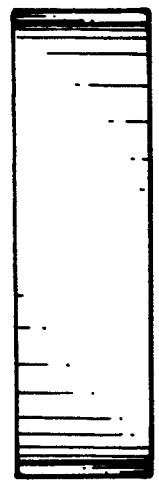
FIG. 7a         FIG. 7b

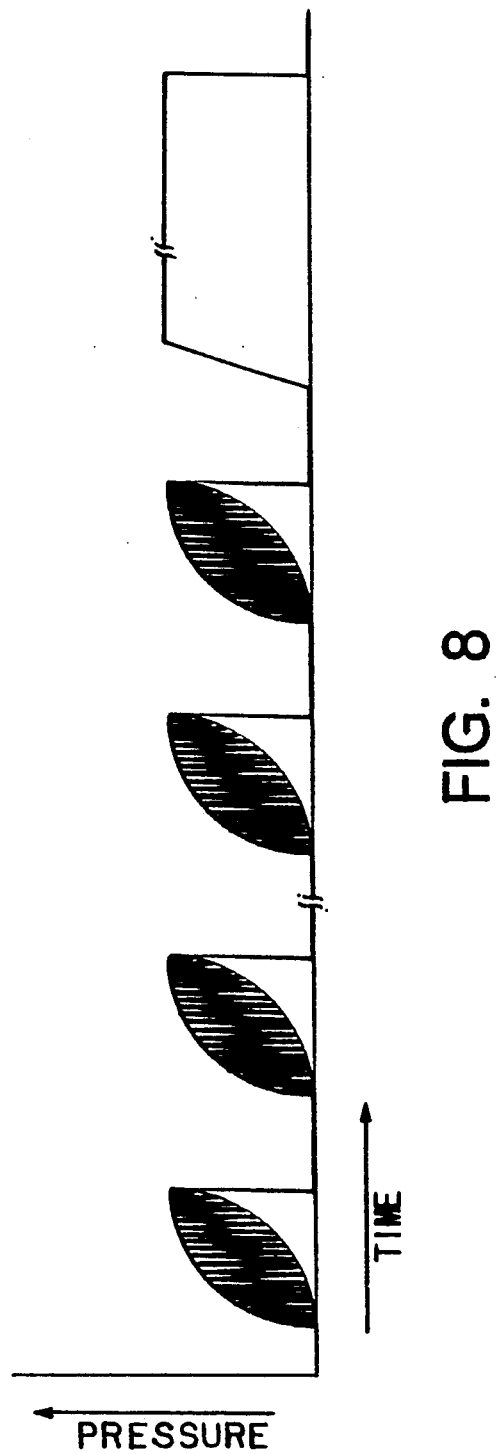

METHOD OF VIBRATION-MOLDING FRICTION MEMBER

BACKGROUND OF THE INVENTION

1. Field of the Invention

The present invention relates to a method of molding, while vibrating, a mixture of materials for a friction member (a brake lining, a disc pad and a clutch facing) for vehicles and industrial machines, which are press-molded under high pressure, while using rubber, resin or the like as a binder. More particularly, the present invention relates to a molding method capable of controlling the physical properties and performance of a friction member in accordance with vibrating conditions.

2. Related Art Statement

In general, friction members, which employ rubber, resin or the like as the binder thereof, are molded in such a manner that a previously-molded member manufactured by molding a mixture of materials at room temperature or the mixture of materials is injected into a mold, which has been heated by an electric heater, so that it is molded by a hydraulic press under pressure.

The major factor of the physical properties and the performance of a frictional material are determined at the time of the press molding. However, the above-described conventional molding method has been performed in accordance with only the following four molding conditions: temperature, pressure, time and the venting condition.

The above-described four molding conditions are respectively usually set in safety regions in terms of maintaining the physical properties and the performance. Therefore, it is difficult to precisely adjust the physical properties and the performance by changing the above-described molding conditions. Accordingly, it might be considered feasible to employ a method which is arranged in such a manner that the physical properties and the performance are adjusted by adjusting the weight of the previously-molded member or by changing the molding pressure. However, a problem arises in that the obtained physical properties and the performance show wide deviation.

SUMMARY OF THE INVENTION

Accordingly, an object of the present invention is to provide a molding method capable of precisely adjusting the physical properties and the performance of a friction member while eliminating a necessity of changing the material.

In order to achieve the above-described object, the structure of the present invention comprises the steps of: accommodating a mixture of materials for a friction member, the binder of which is rubber, resin or the like, into a heated mold in a hydraulic press; and molding the mixture of materials under pressure while giving micro-vibrations, the vibrating conditions of which such as the frequency, the amplitude, the waveform, position at the time of the start and the end of vibrating and the time period can be set as desired, whereby the physical properties and the performance of the frictional material can be changed.

That is, the inventor of the present invention has found a fact that, when a mixture of materials for a friction member, the binder of which is rubber, resin or the like, is heat-molded under pressure, the venting can be easily achieved and the physical properties and the performance can be precisely adjusted although the same material is used by performing molding while giving micro-vibrations under selected vibrating conditions. According to this acknowledgement, the present invention has been established.

The vibration molding method according to the present invention is arranged in such a manner that a mixture of materials for a friction member is heat-molded under pressure while giving the same micro-vibrations. At this time, by properly selecting vibrating conditions such as the frequency, the amplitude, the waveform, the position at the start and the end of the vibrating operation, the time period and the like, the physical properties and the performance can be precisely adjusted. As a result, a desired friction member can be manufactured.

Other and further objects, features and advantages of the invention will appear more fully from the following description.

BRIEF DESCRIPTION OF THE DRAWINGS

FIGS. 5-7 illustrate a molded product among which

FIGS. 6a-6b illustrate the disc pad and

FIGS. 7a-7b illustrate the brake lining, where drawings given symbol a are respectively plan views and drawings given symbol b are respectively side elevational views;

FIG. 8 is a graph which illustrates pressure patterns employed at the molding operation;

DESCRIPTION OF THE PREFERRED EMBODIMENT

Then, a molding method according to the present invention will now be described with reference to FIG. 1.

Figure 1:
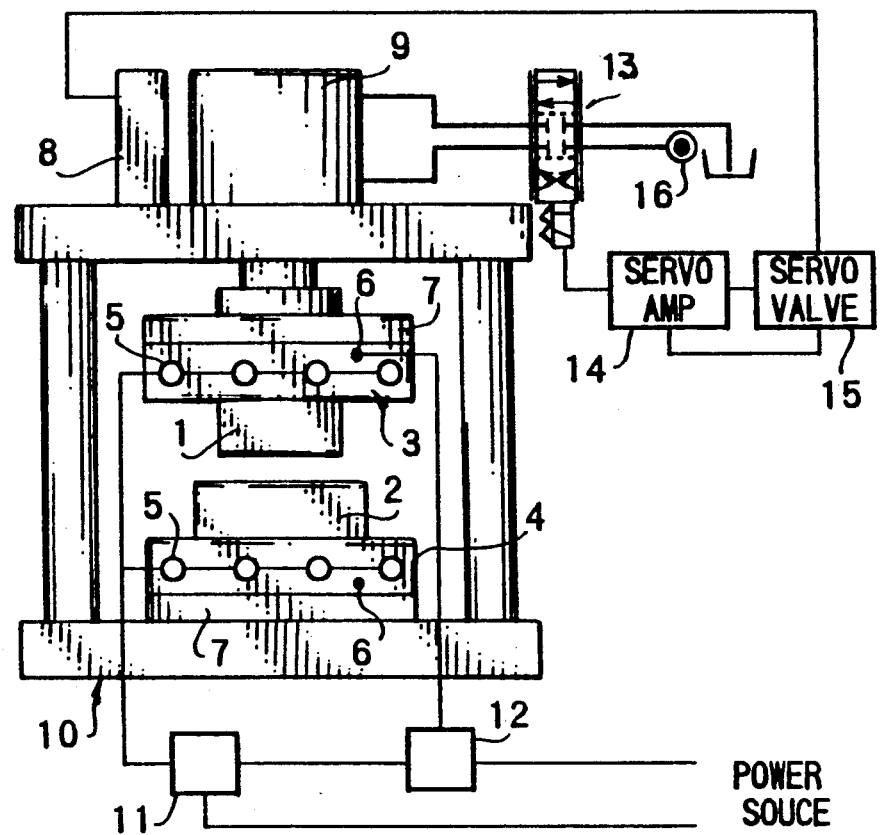
FIG. 1 is a schematic view which illustrates an apparatus adapted to an embodiment of the present invention.
Figure 2A:
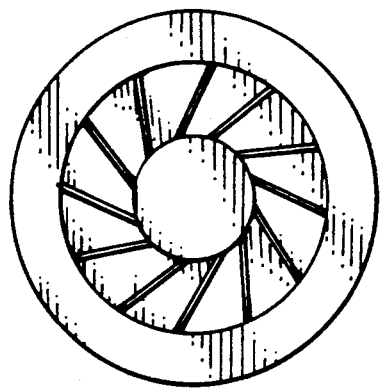
FIGS. 2a-2d illustrate a mold for manufacturing a clutch facing.
Figure 2C:
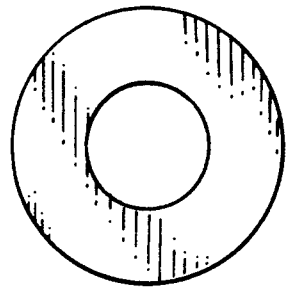
Figure 2B:
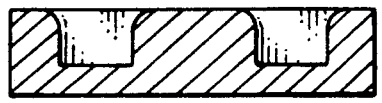
Figure 2D:
Figure 3A:
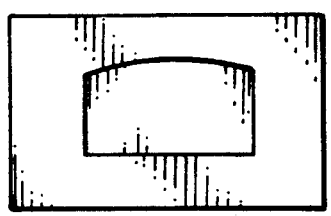
FIGS. 3a-3d illustrate a mold for manufacturing a disc pad.
Figure 3C:
Figure 3B:
Figure 3D:
Figure 4A:
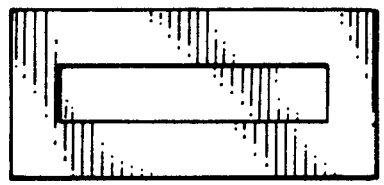
FIGS. 4a-4d illustrate a mold for manufacturing a braking lining, among which drawings given symbol a respectively are plan views each of which illustrates a lower mold, drawings given symbol b respectively are front elevational vertical cross sectional views each of which illustrates the same, drawings given symbol c respectively are plan views each of which illustrates an upper mold and drawings given symbol d respectively are front elevational vertical cross sectional views each of which illustrates the same.
Figure 4C:
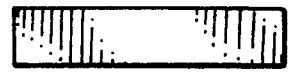
Figure 4B:
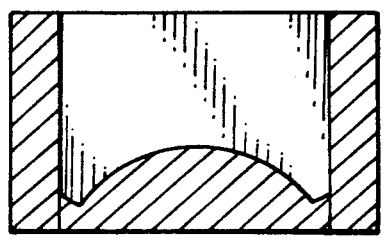
Figure 4D:
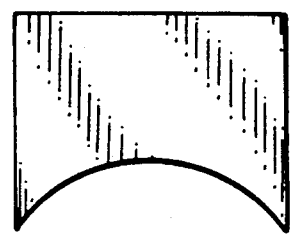
Figure 5A:
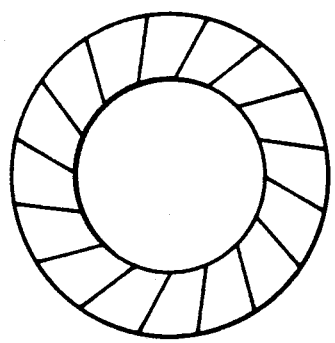
FIGS. 5a-5b illustrate the clutch facing.
Figure 5B:

FIG. 1 is a schematic view which illustrates an apparatus adapted to an embodiment of the present invention. Referring to FIG. 1, reference numeral 1 represents an upper mold, 2 represents a lower mold, 3 represents an upper heating plate and 4 represents a lower heating plate. Each of the above-described heating plates 3 and 4 includes an electric heater 5 so as to be heated by the electric heater 5.

Reference numeral 6 represents a temperature sensor included in each of the heating plates 3 and 4. Reference numeral 7 represents heat insulating materials, 8 represents a differential transformer, 9 represents a hydraulic cylinder and 10 represents a press body. The differential transformer 8 and the hydraulic cylinder 9 are fastened to the press body 10. Furthermore, each of the heat insulating materials 7 is interposed between the upper heating plate 3 and the hydraulic cylinder 9 and between the lower heating plate 4 and the frame of the press body 10.

Reference numeral 11 represents a solid-state relay for turning on/off the electric heater 5 and 12 represents a temperature controller for automatically controlling the temperature of each of the molds 1 and 2. Reference numeral 13 represents a function generator for setting and outputting the vibrating condition. Reference numeral 14 represents a servo amplifier for calculating a feedback signal transmitted from the differential transformer 8 and a command signal generated from the function generator 13 and amplifying/outputting the result of the calculation. Reference numeral 15 represents a servo valve which is operated in accordance with a command signal transmitted from the servo amplifier 14. Reference numeral 16 represents a hydraulic source. The hydraulic cylinder 9 is arranged to be operated by hydraulic pressure supplied from the servo valve 15. Furthermore, while interposing the heat insulating material 7, the upper mold 1 and the operational iron core for the differential transformer 8 are fastened to the front portion of the rod of the hydraulic cylinder 9.

An example of the apparatus adapted to the present invention is constituted as described above. Then, the method of molding the friction member by using the above-described apparatus will now be described.

First, the conditions for vibrating the mixture of materials for the friction member to be molded are previously set in the function generator 13 in the form of the patterns as shown in FIG. 8. Then, the switch of the electric heater 5 is switched on so that the molds 1 and 2 are heated.

Then, when the temperature of the molds has been raised to a predetermined level, a previously-molded member of the mixture of materials or the mixture of the materials is injected into the lower mold 2 as it is before the operation of the apparatus is commenced. As a result, the servo valve 15 is operated in response to a command signal issued from the servo amplifier 14 which receives a commanded vibration issued from the function generator 13 and the feedback signal issued from the differential transformer 8 to calculate them so as to amplify and output the same. As a result, the hydraulic pressure supplied from the hydraulic pressure source 16 passes through the servo valve 15 so that the hydraulic cylinder 9 is operated.

The hydraulic cylinder 9 lowers its rod so that the upper mold 1 repeatedly presses the mixture of materials placed in the lower mold 2 while giving it micro-vibrations set in accordance with the patterns shown in FIG. 8.

The mixture of the materials discharges gas generated therein when it is repeatedly pressed by the upper mold 1 while being given the micro-vibrations. Furthermore, the density of the overall body of the molded material can be equalized. In addition, since it is pushed into the lower mold 2 by the upper mold 1, the overflow of the mixture of materials can be prevented and thereby flash of the molded part can be extremely reduced.

After the vibration molding has been completed as described above, rated pressure molding is performed while omitting the vibrations so that the hardening reaction of the binder is stabilized. The molded product exhibits an excellent efficiency in charging the mixture of materials because the gas can be discharged due to the micro-vibrations given at the time of the vibration molding operation. Furthermore, a product exhibiting extremely excellent quality can be obtained because the density can be equalized and flash can be reduced.

Then, examples of the present invention will now be described.

EXAMPLE 1

| Clutch facing | |
|---|---|
| Size of sample: | Outer diameter 225 mm, Inner diameter 150 mm, Thickness 3.5 mm |
| Material: | Binder: rubber, resin Fiber: long fiber glass |
| Molding condition: | Pressure 100 kg/cm² Temperature of mold 190° C. Vibration molding time × number of time 5 sec × 10 times Rated pressure molding time 60 sec |

Figure 9B:
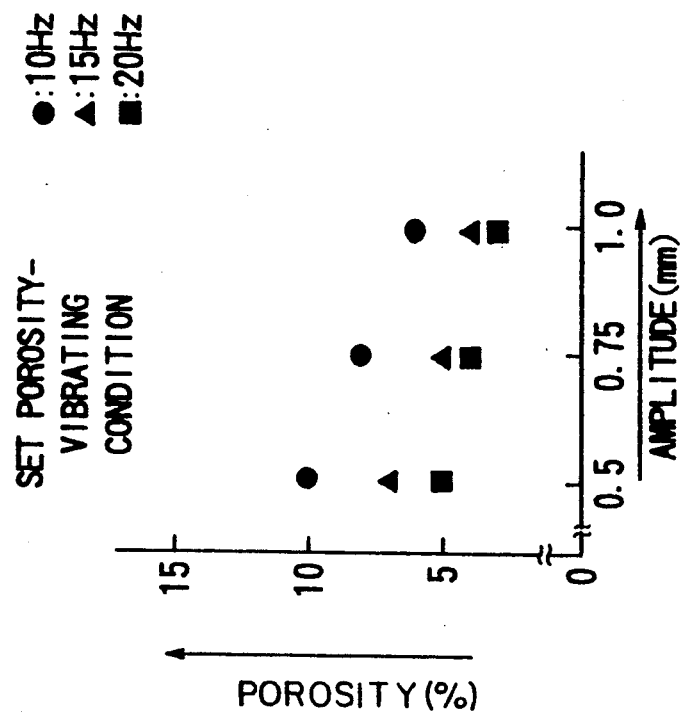
FIGS. 9a-9b are graphs which illustrate set vibrating conditions for the clutch facing.
Figure 9A:
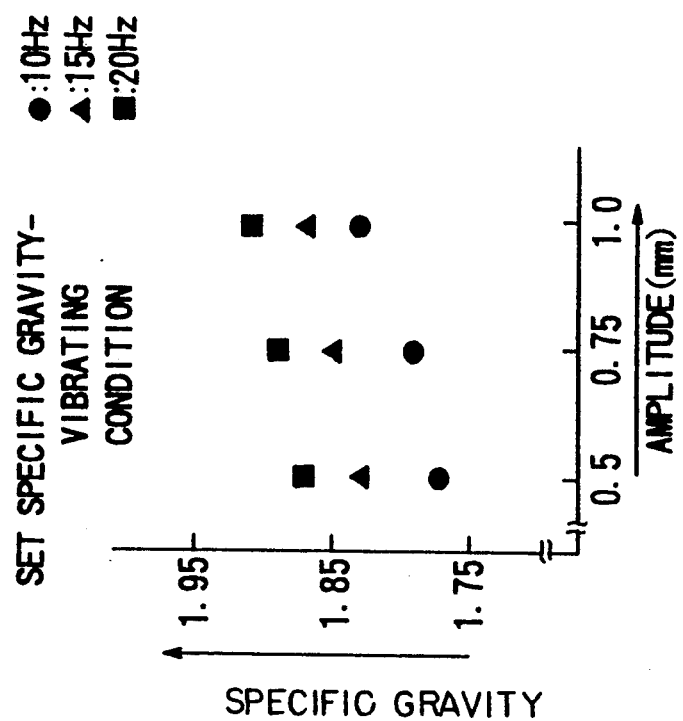

The results of the physical properties and the performance experiments carried out about the clutch facing were as shown in Table 1, the clutch facing being obtained by molding under the above-described conditions, by using the mold as shown in FIGS. 2a–2d while employing the set specific gravity-vibrating conditions as shown in a graph of FIG. 9a and set porosity-vibrating conditions as shown in a graph of FIG. 9b.

TABLE 1

| Set vibrating conditions | | Physical property | | Performance | | |
|---|---|---|---|---|---|---|
| Frequency (Hz) | Amplitude (mm) | Specific gravity | Porosity (%) | Stable frictional coefficient | Frictional performance | Judder performance |
| 20 | 1.0 | 1.91 | 2.8 | 0.37 | ⊙ | Δ |
| 15 | 0.75 | 1.84 | 5.2 | 0.45 | ◯ | ◯ |
| 10 | 0.5 | 1.76 | 9.8 | 0.49 | Δ | ⊙ |
| Conventional Product | | 1.83 to 1.85 | 4 to 6 | 0.42 to 0.46 | — | — |

⊙ Superior to the product molded by the conventional method
◯ Equivalent to the product molded by the conventional method
Δ Inferior to the product molded by the conventional method

EXAMPLE 2

| Disc pad | |
| --- | --- |
| Sample size: | about 105 mm × 45 mm for small vehicles |
| Material | Binder: resin<br>Fiber: asbestos fiber |
| Molding condition: | Pressure 500 kg/cm$^2$<br>Temperature of mold 170° C.<br>Vibration molding time ×<br>number of time 5 sec × 8 times<br>Rated pressure molding time 60 sec |

Figure 10B:
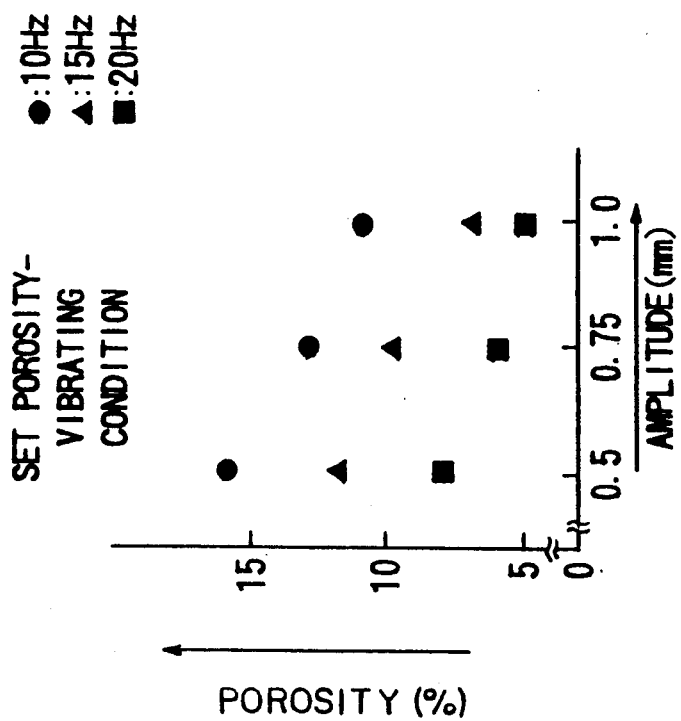
FIGS. 10a-10b are graphs which illustrate set vibrating conditions for the disc pad.
Figure 10A:
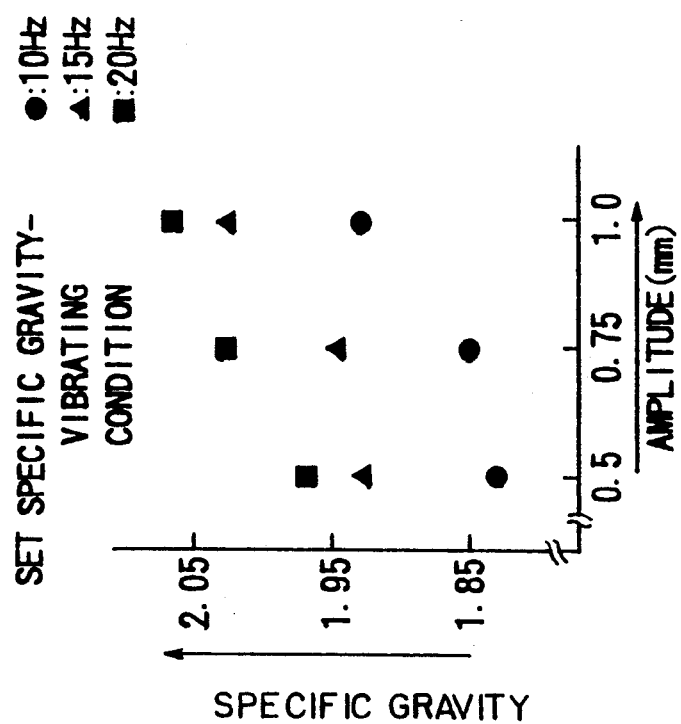

The results of the physical properties and the performance experiments carried out about the disc pad were as shown in Table 2, the disc pad being obtained by molding under the above-described conditions, by using the mold as shown in FIGS. 3a–3d while employing the set specific gravity-vibrating conditions as shown in a graph of FIG. 10a and set porosity-vibrating conditions as shown in a graph of FIG. 10b.

TABLE 2

| Set vibrating conditions | | Physical property | | Performance | | |
| --- | --- | --- | --- | --- | --- | --- |
| Frequency (Hz) | Amplitude (mm) | Specific gravity | Porosity (%) | Stable frictional coefficient | Frictional performance | Judder performance |
| 20 | 1.0 | 2.06 | 5.4 | 0.41 | ⊚ | Δ |
| 15 | 0.75 | 1.95 | 9.7 | 0.44 | ○ | ○ |
| 10 | 0.5 | 1.83 | 16.3 | 0.49 | Δ | ⊚ |
| Conventional Product | | 1.92 to 1.96 | 8 to 11 | 0.44 to 0.46 | — | — |

⊚ Superior to the product molded by the conventional method
○ Equivalent to the product molded by the conventional method
Δ Inferior to the product molded by the conventional method

EXAMPLE 3

| Brake lining | |
| --- | --- |
| Sample size: | Width 35 mm, Inner R 93 mm,<br>Angle of development 115°<br>for small vehicles |
| Material | Binder: resin<br>Fiber: quebracho fiber,<br>glass fiber |
| Molding condition: | Pressure 200 kg/cm$^2$<br>Temperature of mold 150° C.<br>Vibration molding time ×<br>number of time 5 sec × 5 times<br>Rated pressure molding time 60 sec |

Figure 11B:
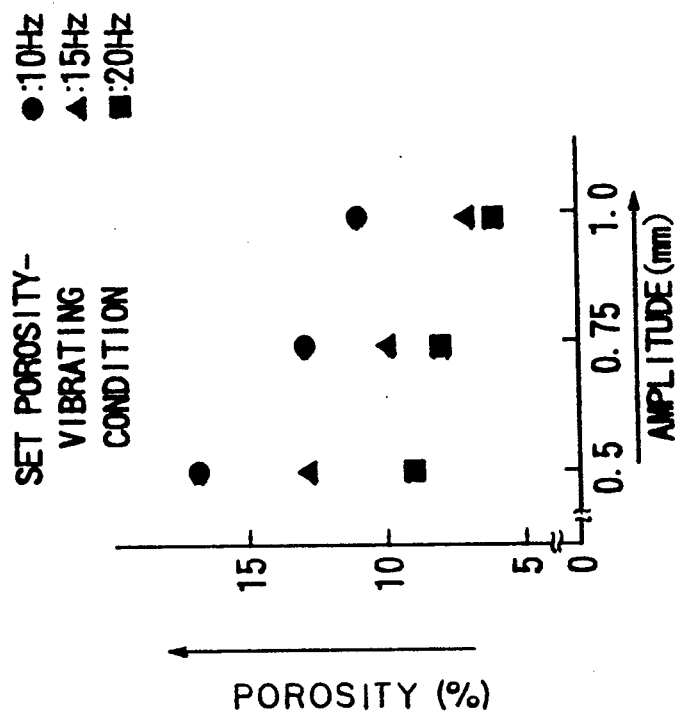
FIGS. 11a-11b are graphs which illustrate set vibrating conditions for the brake lining; among which graphs given symbol a respectively show set specific gravity-vibrating conditions and graphs given symbol b respectively show set porosity-vibrating conditions.
Figure 11A:
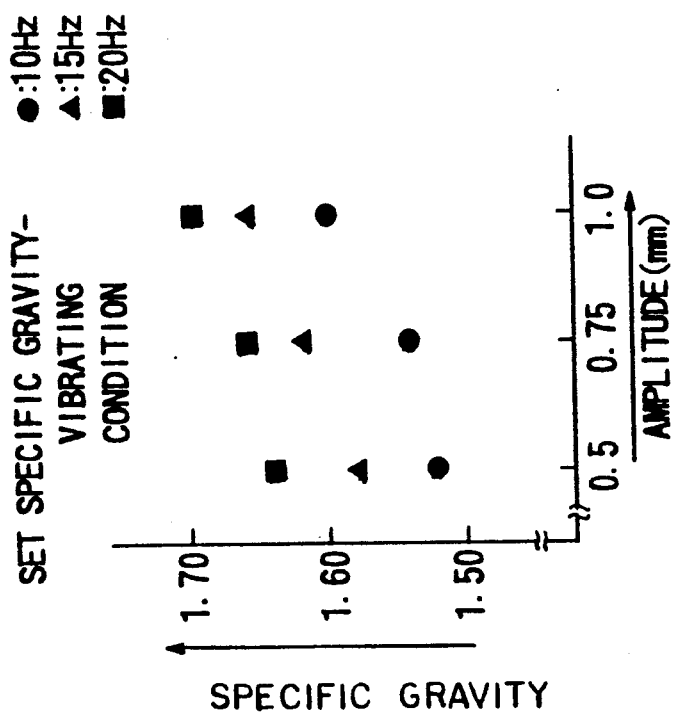

The results of the physical properties and the performance experiments carried out about the brake lining were as shown in Table 3, the brake lining being obtained by molding under the above-described conditions, by using the mold as shown in FIGS. 4a–4d while employing the set specific gravity-vibrating conditions as shown in a graph of FIG. 11a and set porosity-vibrating conditions as shown in a graph of FIG. 11b.

TABLE 3

| Set vibrating conditions | | Physical property | | Performance | | |
| --- | --- | --- | --- | --- | --- | --- |
| Frequency (Hz) | Amplitude (mm) | Specific gravity | Porosity (%) | Stable frictional coefficient | Frictional performance | Judder performance |
| 20 | 1.0 | 1.69 | 6.2 | 0.32 | ⊚ | Δ |
| 15 | 0.75 | 1.61 | 10.2 | 0.37 | ○ | ○ |
| 10 | 0.5 | 1.51 | 17.3 | 0.42 | Δ | ⊚ |
| Conventional Product | | 1.58 to 1.62 | 9 to 12 | 0.36 to 0.38 | — | — |

⊚ Superior to the product molded by the conventional method
○ Equivalent to the product molded by the conventional method
Δ Inferior to the product molded by the conventional method As described above, according to the present invention, when a friction member which employs rubber, resin or the like as the binder is molded, the mixture of materials, which has been previously molded, or the mixture of materials is heat-molded under pressure while being given micro-vibrations. Therefore, the gas can be satisfactorily discharged at the molding operation, causing efficiency of charging the mixture of materials to be improved. Furthermore, the density of the molded material can be equalized and flash of the molded part can be reduced. By selecting proper vibrating conditions at the time of the molding operation, the physical properties and the performance of the friction member can be precisely adjusted in a satisfactory wide range of ±5 to 50% even if the same material is used.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A vibration molding method in which a desired specific gravity and porosity are achieved in a molded friction member, the method comprising the steps of:
   a. accommodating materials forming the molded friction member in a mold in a press;
   b. increasing and relaxing pressure on the materials in the mold a predetermined plural number of times, the pressure at which relaxation begins being a predetermined rated pressure;
   c. vibrating the mold while the pressure on the materials is increasing, the vibrations having a predetermined frequency and predetermined amplitudes to achieve the desired specific gravity and porosity; and d. after final relaxation in step b., applying the rated pressure to the materials in the mold for a predetermined period of time without vibration.

2. The method as defined in claim 1 wherein a rate of increase of pressure on the materials in the mold in step b. is less than about 100 kg/cm$^2$/sec.

3. The method as defined in claim 1 wherein the predetermined frequency is between about 10 hertz and 20 hertz.

4. The method as defined in claim 1 wherein the amplitudes have a maximum of between about 0.5 to 1.0 millimeters.

5. The method as defined in claim 1 wherein the predetermined number of times increasing and relaxing the pressure is less than ten.

6. The method as defined in claim 1 wherein the predetermined period of time maintaining the rated pressure is less than two minutes.

7. The method as defined in claim 1 wherein the materials include a binder selected from the group consisting of rubber and resin and wherein the method includes the step of heating the mold.

8. The method as defined in claim 1 wherein the predetermined rated pressure is less than about 500 kg/cm$^2$.

9. A vibration molding method in which a desired specific gravity and related porosity are achieved in a molded friction member, the method comprising the steps of:

a. accommodating materials forming the molded friction member in a heated mold in a press, the materials including a binder selected from the group consisting of rubber and resin;

b. increasing and relaxing pressure on the materials in the mold a predetermined plural number of times less than ten, the pressure at which relaxation begins being a predetermined rated pressure less than about 500 kg/cm$^2$ and a rate of increase of pressure being less than about 100 kg/cm$^2$/sec;

c. vibrating the mold while the pressure is increasing to the rated pressure, the vibrations having a predetermined frequency between about 10 and 20 hertz and amplitudes having a maximum less than about one millimeter to achieve the desired specific gravity and related porosity; and d. after final relaxation in step b., applying without vibration the rated pressure to the materials in the heated mold for a predetermined period of time less than about two minutes.

* * * * *